(12) United States Patent
Goosey

(10) Patent No.: US 6,391,188 B1
(45) Date of Patent: May 21, 2002

(54) PROCESSES AND APPARATUS FOR RECOVERY AND REMOVAL OF COPPER FROM FLUIDS

(75) Inventor: Martin T. Goosey, Nuneaton (GB)

(73) Assignee: Shipley Company, L.L.C., Marlborough, MA (US)

( * ) Notice: Subject to any disclaimer, the term of this patent is extended or adjusted under 35 U.S.C. 154(b) by 0 days.

(21) Appl. No.: 09/545,154

(22) Filed: Apr. 7, 2000

(30) Foreign Application Priority Data

Apr. 7, 1999 (GB) .............................................. 9907848

(51) Int. Cl.[7] .......................... C02F 1/461; C25B 15/00; C25B 9/00
(52) U.S. Cl. ....................... 205/746; 205/747; 204/240; 204/252
(58) Field of Search ................................ 204/252, 263, 204/257; 205/746, 747, 750

(56) References Cited

U.S. PATENT DOCUMENTS

| | | | |
|---|---|---|---|
| 3,737,381 A | * 6/1973 | White et al. ............ | 204/257 X |
| 3,783,113 A | 1/1974 | Newton et al. | |
| 4,073,708 A | * 2/1978 | Hicks, Jr. ............... | 204/252 X |
| 4,545,877 A | * 10/1985 | Hillis ..................... | 204/237 X |
| 5,478,448 A | * 12/1995 | Schneider ................... | 205/554 |
| 5,667,557 A | 9/1997 | Fleming et al. | |

OTHER PUBLICATIONS

Patent Abstracts of Japan, vol. 1999, No. 13, Nov. 30, 1999 & JP 11 229172 A (Permelc Electrode Ltd.) Aug. 24, 1999.

* cited by examiner

Primary Examiner—Donald R. Valentine
(74) Attorney, Agent, or Firm—Peter F. Corless; S. Matthew Cairns; Darryl P. Frickey

(57) ABSTRACT

The invention provides novel processes and apparatus for removal of copper from a solution or fluid, particularly spent etchant solutions that contain copper produced through printed circuit board manufacture. The invention is particularly useful for recovery/removal of copper from aqueous admixtures that contain a copper complexing agent.

28 Claims, 1 Drawing Sheet

PROCESSES AND APPARATUS FOR RECOVERY AND REMOVAL OF COPPER FROM FLUIDS

BACKGROUND

1. Field of the Invention

The present invention relates to improved processes and apparatus for removal and recovery of copper, particularly from solutions such as spent etchant-type solutions produced in printed circuit (wiring) board manufacture.

2. Background

Multilayer printed circuit boards are used for a variety of electrical applications and provide the advantage of conservation of weight and space. A multilayer board is comprised of two or more circuit layers, each circuit layer separated from another by one or more layers of dielectric material. Circuit layers are formed by applying a copper layer onto a polymeric substrate. Printed circuits are then formed on the copper layers by techniques well known to the art, for example print and etch to define and produce the circuit traces—i.e., discrete circuit lines in a desired circuit pattern. Once the circuit patterns are formed, a stack is formed comprising multiple circuit layers separated from each other by a dielectric layer, typically epoxy. Thereafter, the stack is subjected to heat and pressure to form the laminated multilayer circuit board.

Following lamination, the multiple circuit layers are electrically connected to each other by drilling through holes through the board surface. Resin smear from through-hole drilling is removed under rather stringent conditions, for example, by treatment with a concentrated sulfuric acid or hot alkaline permanganate solution. Thereafter, the through-holes are further processed and plated to provide a conductive interconnecting surface.

Prior to lamination and through hole formation, the discrete copper circuit lines are typically treated with an adhesion promoter to improve bond strength between each circuit layer and adjacent interleaving dielectric resin layers. One method used by the art to improve bond strength involves oxidative treatment of the copper circuit lines to form a copper oxide surface coating on the circuit lines. The oxide coating is usually a black or brown oxide layer that adheres well to the copper. The oxide possesses significantly more texture or roughness than an untreated copper surface. Chemical treatments which produce adherent conversion coatings on metal surfaces, such as black oxide, are very commonly used as to promote adhesion of organic materials to metals. Other examples include metal phosphate coatings used as paint adhesion promoters. Such roughened and conversion coated surfaces enhance adhesion and wettability to the adjacent insulating layer by a mechanism that is believed to include mechanical interlocking between the metal surface and a dielectric resin layer. Metal surfaces that have been microetched, but not conversion coated do not generally possess as high a degree of surface roughness and texture, as can be inferred from their greater reflection of visible light.

Other techniques known in the art to promote adhesion between copper surfaces and dielectric resins prior to multilayer lamination include the use of etches inclusive of cupric chloride etchants, mechanical treatments designed to produce surface texture, and metal plating, all designed to produce roughened surfaces.

Highly useful compositions for treatment of copper and its alloys to form an etched surface suitable for lamination of circuit layers in multilayer circuit fabrication have been disclosed in U.S. patent application Ser. No. 09/198880, filed Nov. 24, 1998, and corresponding South Korean patent application no. 9854330, and Japanese Application 37764/1998, Publication Number 10-377764/1998, all assigned to the Shipley Company. The disclosed compositions are acidic aqueous solutions and contain inter alia a triazole, preferably benzotriazole together with a peroxide, preferably hydrogen peroxide.

While such etchant solutions are highly effective, the compositions also yield a waste solution that contains copper. Such spent etchant solutions may be undesirable from a waste treatment/cost perspective. For example, copper waste solutions have been disposed of by off-site contractor or generate large quantities of sludge. In either approach, the spent solutions and/or their contained metals are typically eventually consigned to landfill.

Clearly, practical alternative methods of treatment or disposal of such solutions containing copper would be very desirable.

SUMMARY OF THE INVENTION

The present invention provides novel processes and apparatus for removal of copper from a solution or fluid, particularly spent etchant solutions that contain copper produced through printed circuit board manufacture.

The invention is particularly useful for recovery/removal of copper from aqueous admixtures that contain a copper complexing agent, e.g. a nitrogen-containing compound including cyclic compounds such as an azole, particularly a tetrazole, triazole or thiadiazole, or other agent that can complex with copper such as non-cyclic compounds, particularly amines, preferably secondary or tertiary amines which may optionally have acidic moieties such as EDTA. The complexing agent also may be aromatic such as benzotriazole or benzothiadiazole. The invention is particularly useful for recovery/removal of copper from aqueous admixtures that contain a benzotriazole, or other triazole. Systems of the invention can be characterized at least in part by use of a separated (e.g. interposed ion-permeable membrane) electrolytic copper removal from such aqueous admixtures.

It has been surprisingly found that copper can not be effectively removed from solutions containing a copper complexing agent such as benzotriazole by many methods such as precipitation and simple plating. However, it has been found that copper can be removed most effectively from such solutions using a separated cell system, enabling convenient treatment of copper etchant solutions.

Without being bound by any theory, it is currently thought that other methods of copper removal are unsuccessful as a result of the combination of the copper being present in complexed form with a complexing agent such as benzotriazole and the polarisation being conferred on any immersed cathode (on a simple plate-out procedure) by the complexing agent.

In particular detail, microetch solutions based on sulfuric acid and peroxide are formulated for application within the printed circuit inner layer process manufacturing stages with relatively large amounts of contained complexant chemistry, e.g. a benzotriazole or other triazole. After use on a process line, such microetches generally become exhausted when the contained copper levels approach about 20 to 25 grams per litre. At that stage, the solution would be discarded and require treatment via disposal to satisfy local environmental compliance as is in effect in the United Kingdom and elsewhere.

By the processes and apparatus of the present invention, copper can be removed from such spent microetch solutions, and the treated solutions either re-used in a copper microetching solution, or the solution disposed of without the concern of copper content.

A wide variety of other solutions and other compositions containing copper may be treated in accordance with the invention. For instance, an aqueous admixture that contains copper, but not a copper complexing agent, may have a removal/purification effective amount of a complexing agent such as benzotriazole or EDTA added to the copper admixture and that admixture copper treated via a separated cell system in accordance with the invention. Relatively small amounts of a complexing agent can be added to a copper containing solution in order to effectively remove the copper in accordance with the invention, e.g. less than 20 or 10 mole percent of the complexing agent relative to the copper in the admixture. Larger amounts of the complexing agent also may be employed. Optimal amounts of complexing agent to be added to a copper containing admixture (e.g. aqueous copper solution) for removal of the copper can be determined by simple testing, e.g. various test samples of the copper admixture have differing amounts of the complexing agent added thereto can be treated via a separated cell system in accordance with the invention, and the treated sample then can be tested for copper content.

Copper removal systems of the invention include an electrodialysis unit, and the solution for copper recovery (e.g. a spent microetch solution) may be used as the anolyte or catholyte. Thus, for instance, if the microetch solution is used as the anolyte, a wide variety of compatible electrolytes may be used as the catholyte, e.g. acidic solutions of sulfuric acid, fluoroboric acid, methane sulphonic acid and the like. Preferably the solution to be treated (e.g. the microetch solution) is used as the anolyte, and an acidic solution that does not contain copper or a benzotriazole or other triazole or other copper complexing agent (e.g. a dilute $H_2SO_4$ solution) is used as the catholyte. For example, waste plating solutions that contain copper can be treated via a separated cell system in accordance with the invention to thereby remove copper therefrom.

It should be appreciated that although the present invention is generally discussed in the context of copper removal/recovery from aqueous solutions produced through printed circuit board manufacture, the invention also will be applicable to removal/recovery of copper from solutions and mixtures produced in other manufacturing processes.

It should be further appreciated that references herein to removal/recovery of copper from solutions are inclusive of removing those metals as may be present as dispersions or other forms in a solvent. Typically, solutions treated for metal removal/recovery in accordance with the invention will be aqueous solutions, but those solutions also may comprise an organic solvent component, particularly where the organic solvent is miscible with water.

The term "complexing agent" or "copper complexing agent" as used herein refers to any compound that when present with can effect removal of copper from an aqueous admixture via a separated electroyltic cell as disclosed herein. Thus, complexing agents can be identified by simple testing, i.e. a candidate complexing agent can be added to an aqueous solution that contains copper, that solution passed through a separated electrolytic cell in accordance with the invention, and the treated solution analyzed for copper removal. The complexing agent will typically complex or otherwise interact with copper in the admixture.

Other aspects of the invention are disclosed infra.

DETAILED DESCRIPTION OF THE INVENTION

Figure 1:
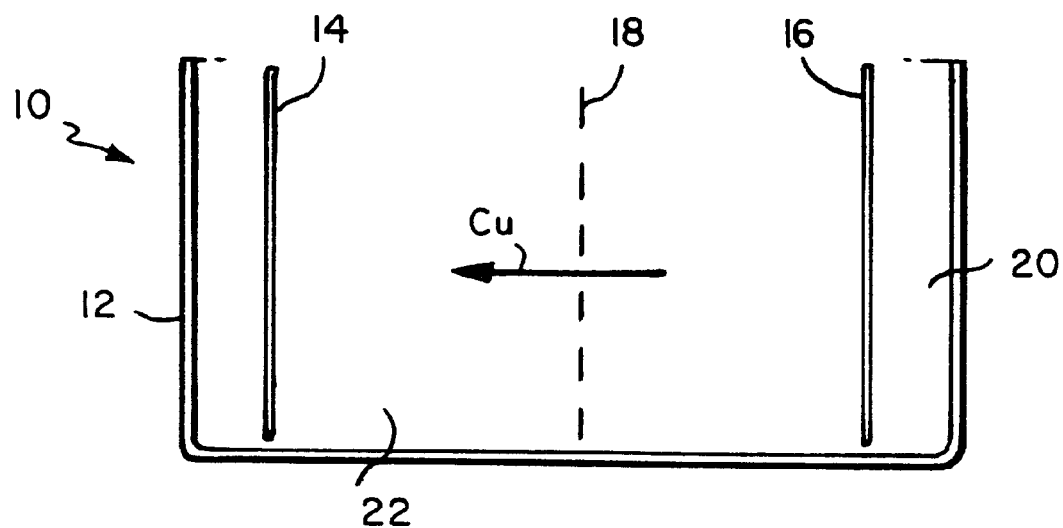
FIG. 1 shows schematically a preferred copper removal system of the invention.

As stated above, the systems and processes of the invention enable removal of copper from copper-containing fluids. In particular, the invention enables removal of copper by use of an electrolytic cell with cathode and anodes separated by an ion-permeable membrane to provide a treated solution that is completely or at least essentially devoid of copper (e.g. a treated solution having less than about 10000, 1000 or 100 parts per million of copper). The copper removal systems of the invention may be used in a batch-type treatment manner, or as a flow-through system. Systems of the invention also may contain other apparatus such as a filtration step either before, during or after electrolysis, and the like.

Reference is now made to FIG. 1 of the Drawings, Which depicts a preferred electrolytic copper removal system 10 of the invention. In use, a solution from which copper is to be removed is introduced into vessel 12. Vessel 12 suitably may be constructed of a variety of materials such as a clear polyvinyl chloride or a polypropylene, or other material that will be essentially inert to the anolyte and catholyte solutions.

System 10 contains cathode 14 and anode 16 that are separated by a copper ion permeable membrane 18. Cathode 14 may be formed from any of a variety of suitable materials, e.g. stainless steel or other metallic material such as copper. Similarly, anode 16 may be formed from any of a variety of materials, preferably a metallic mesh, such as a titanium mesh anode. A specifically preferred anode 16 is a halide resistant precious metal oxide coated titanium mesh anode, and a preferred cathode 14 is a 316 stainless steel sheet cathode.

Cathode 14 and anode 16 are preferably positioned such as depicted in FIG. 1 so that the anode and cathode are substantially or fully immersed in the anolyte and catholyte.

The interposed permeable membrane 18 also may be formed from a variety of materials that will permit flow of copper cations therethrough. A preferred membrane material is a cation exchange membrane such as Nafion materials (available from DuPont) that comprise reinforced sulphonic or sulphonic composite films. Multiple membranes 18 also may be suitably employed between the anode and cathode.

Suitable conditions for electrolytic copper removal in accordance with the invention may vary relatively widely. Typical operating conditions for the cell 10 of the configuration shown in FIG. 1 are a cell operation of from about 2 to 8 volts, more preferably about 4 to 6 volts at a current density of from about 1 to 3 amps per square dm. Preferably anode and cathode surface areas are approximately 1:1 (i.e. about the same surface area), and preferably the anode and cathode are sited between about 1 and 5 cms apart, more preferably between about 2 and 3 cms apart. The vessel 14 also may contain a circulation pump (not shown).

As discussed above, the fluid containing copper for removal can suitably serve as the anolyte. A dilute aqueous acidic solution can serve as the other electrolyte, preferably the catholyte.

In use of system 10, copper cations within the fluid 10 in the anolyte section are transported across the divided cell's one or more ion permeable membrane 18 into the catholyte (acidic aqueous solution) and copper then plated onto the cathode 14.

Preferably cathode 14, anode 16 and membrane 18 are fitted into system 10 in removable fashion, e.g. via a top handle and slots within vessel 12. Such removable components will facilitate use and maintenance of the system.

As discussed above, fluid containing copper can be treated either in a batch or flow-through approach. In a flow-through approach, treated solution may be returned or recycled for further etching use. In the flow-through approach, the vessel 12 depicted in FIG. 1 would include suitable entry and exit apertures for delivery and recovery of the spent and treated fluids respectively.

The dimensions of systems 10 and components thereof of the invention can vary widely and generally will be adapted for convenient use in a printed circuit board manufacturing location, or other location where copper is to be removed from a targeted solution. One suitable system has a vessel 10 about 3 feet long and two feet in height.

Used or "spent" etchant solutions from printed circuit manufacture often may contain from about at least about 1 to about 5 grams per liter of copper, commonly at least about 15, 20 or 25 grams per liter of copper. The levels of copper in such solutions often vary with manufacturing control exerted during board production.

Copper can be removed from such fluids in accordance with the invention to provide solutions having less than about 10000 parts per million of copper, more typically less than about 1000, 100 or 10 parts per million of copper.

As a consequence, solutions treated in accordance with the invention can-be disposed without generating solid wastes. This can provide a substantial benefit over current practices which can entail disposing of metal-containing sludge of the spent solutions in landfills or other waste sites.

With reference to FIG. 1, one particularly preferred system of the invention has a 316 stainless steel sheet cathode 14; an anode 16 of titanium mesh coated with a chemically inert precious metal oxide; membrane 18 is Nafion (DuPont) 350 cation exchange membrane; anolyte 20 is an aqueous sulfuric acid solution containing at least about 10 grams per liter of copper, hydrogen peroxide and benzotriazole; and the catholyte 22 is a 2 weight percent aqueous sulfuric acid solution. Other Nafion membrane materials available from DuPont also may be suitable and may be selected for particular selectively. of the complexing agent of a specific solution being treated. The anolyte may be a Circubond Treatment 180 Solution (Shipley Company, Coventry, U.K.) that contains copper as a result of microetching copper clad printed circuit board substrates. The anolyte 20 is subjected to continuous particulate filtration. An applied current density of about 100 amps per square meter would be preferred. Upon passage of an electric current between the inert anode within the anolyte solution and the cathode within the catholyte solution, copper is transported across the permeable membrane and deposited in metallic form on the cathode surface. Oxygen may be substantially simultaneously liberated at the anode surface which will serve to oxidize organic moieties contained within the anolyte solution.

All documents mentioned herein are incorporated herein by reference.

The foregoing description of the invention is merely illustrative thereof, and it is understood that variations and modifications can be effected without departing from the spirit or scope of the invention as set forth in the following claims.

What is claimed is:

1. A process for removal of copper from a mixture that contains a copper complexing agent, comprising:

providing a system that comprises an electrolytic cell that comprises an anode and a cathode separated by a copper ion-permeable membrane;

adding to the system a fluid that contains copper and a copper complexing agent; and electrolytically treating the fluid.

2. The process of claim 1 wherein the fluid is flowed through the system.

3. The process of claim 1 or 2 wherein the fluid is produced from a printed circuit manufacturing process.

4. The process of claim 1 wherein fluid containing copper and a copper complexing agent is added to the anolyte of the cell.

5. The process of claim 1 wherein the fluid is an aqueous acidic solution that contains a copper complexing agent.

6. The process of claim 1 wherein the copper complexing agent is a triazole.

7. The process of claim 1 wherein the fluid is an aqueous acidic solution that contains a benzotriazole and a peroxide.

8. The process of claim 1 wherein the fluid is an aqueous sulfuric acid solution that contains a benzotriazole and hydrogen peroxide.

9. The process of claim 1 wherein fluid add to the system has a copper concentration of at least 5 grams per liter of fluid, ands the system electrolytically removes copper from the fluid whereby the copper concentration of the treated fluid is about 10000 parts per million or less.

10. A system for removal of copper from a mixture, comprising an electrolytic cell that comprises an anode and a cathode separated by a copper ion-permeable membrane, a mixture comprising copper and a copper complexing agent as the catholyte or anolyte for the cell, and a filtration apparatus.

11. The system of claim 10 wherein a mixture comprising copper and a copper complexing agent is present as the anolyte of the cell.

12. The system of claim 10 wherein the mixture is produced from a printed circuit board manufacturing process.

13. The system of claim 10 wherein the copper complexing agent is a nitrogen-containing compound.

14. The system of claim 10 wherein the copper complexing agent is an azole.

15. The system of claim 10 wherein the copper complexing agent is a tetrazole or triazole.

16. The system of claim 10 wherein the copper complexing agent is benzotriazole.

17. The system of claim 10 wherein the mixture is an aqueous acidic solution that contains a benzotriazole and a peroxide.

18. The system of claim 10 further comprising a filtration apparatus.

19. A system for removal of copper from a mixture, comprising an electrolytic cell that comprises an anode and a cathode separated by a copper ion-permeable membrane, and a filtration apparatus.

20. The system of claim 19 further comprising a mixture comprising copper and a copper complexing agent as the catholyte or anolyte of the cell.

21. A method for copper removal, comprising:
a) providing a system that comprises 1) an electrolytic cell that comprises an anode and a cathode separated by a copper ion-permeable membrane, and 2) fluid that contains copper and is produced from a printed circuit board manufacturing process;
b) electrolytically treating the fluid.

22. The method of claim 21 wherein the fluid that is electrolytically treated comprises a copper complexing agent.

23. The method of claim 22 wherein the copper complexing agent is added to the fluid prior to the electrolytic treatment.

24. The method of any one of claims 21 through 23 wherein the fluid is flowed through the system.

25. The method of claim 22 wherein the fluid is an aqueous acidic solution.

26. The method of claim 22 wherein the fluid is present as the anolyte of the cell.

27. The method of claim 22 wherein the copper complexing agent is a nitrogen-containing compound.

28. The method of claim 22 wherein the copper complexing agent is an azole.

* * * * *